US012353153B2

(12) United States Patent
Kosuge et al.

(10) Patent No.: US 12,353,153 B2
(45) Date of Patent: Jul. 8, 2025

(54) POST-PROCESSING DEVICE WITH A PRESSING SECTION

(71) Applicant: SEIKO EPSON CORPORATION, Tokyo (JP)

(72) Inventors: Hiroyuki Kosuge, Matsumoto (JP); Riku Maeda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 17/815,315

(22) Filed: Jul. 27, 2022

(65) Prior Publication Data

US 2023/0035758 A1 Feb. 2, 2023

(30) Foreign Application Priority Data

Jul. 30, 2021 (JP) ................................ 2021-125679

(51) Int. Cl.
*G03G 15/00* (2006.01)

(52) U.S. Cl.
CPC ..... *G03G 15/6547* (2013.01); *B65H 2301/16* (2013.01); *G03G 15/6573* (2013.01); *G03G 2215/00911* (2013.01)

(58) Field of Classification Search
CPC ........... G03G 15/6547; G03G 15/6573; G03G 2215/00911; B65H 2301/16; B65H 3/54; B65H 2301/4223
See application file for complete search history.

(56) References Cited

U.S. PATENT DOCUMENTS 10,289,050 B2 * 5/2019 Shibasaki .......... G03G 15/6541
2016/0176208 A1 * 6/2016 Osada .................... B65H 31/38 347/104
2020/0307944 A1 * 10/2020 Shibasaki .............. B65H 31/02

FOREIGN PATENT DOCUMENTS

JP 2005-001893 1/2005
JP 2012180150 A * 9/2012 ............. B42C 1/125
JP 2013-193870 A 9/2013

OTHER PUBLICATIONS

Machine Translation of Fukami JP2012180150A (Year: 2012).*

* cited by examiner

*Primary Examiner* — Stephen D Meier
*Assistant Examiner* — Quang X Nguyen
(74) *Attorney, Agent, or Firm* — WORKMAN NYDEGGER

(57) ABSTRACT

A post-processing device includes a first discharge section that discharges a medium subjected to recording by a recording device, a first tray on which the medium discharged by the first discharge section is mounted, a post-processing section that performs post-processing on the medium mounted on the first tray, a pressing section configured to perform a leading-end pressing operation of lowering a leading end of the medium by pressing the medium discharged by the first discharge section, and a control section that controls the pressing section, in which the control section performs the leading-end pressing operation after the medium is mounted on the first tray.

13 Claims, 8 Drawing Sheets

POST-PROCESSING DEVICE WITH A PRESSING SECTION

The present application is based on, and claims priority from JP Application Serial Number 2021-125679, filed Jul. 30, 2021, the disclosure of which is hereby incorporated by reference herein in its entirety.

BACKGROUND

1. Technical Field

The present disclosure relates to a post-processing device.

2. Related Art

For example, as in JP-A-2013-193870, there is known a finisher, which is an example of a post-processing device, for performing side-binding processing, which is an example of post-processing, on a sheet, which is an example of a medium, having an image formed thereon. The finisher includes a discharge roller, which is an example of a first discharge section, a processing tray, which is an example of a first tray, a front regulating section, and a rear regulating section.

The front regulating section and the rear regulating section each include a leading-end guiding section and a leading-end pressing section. The leading-end guiding section guides, to the leading-end pressing section, the sheet discharged by the discharge roller in a discharge direction. The leading-end pressing section presses the guided sheet from above.

A recorded medium may be subjected to so-called curling that causes the medium to warp upward due to expansion of fibers that form the medium. It is possible to reduce curling by pressing the medium. However, according to JP-A-2013-193870, since the sheet discharged by the discharge roller comes into contact with the leading-end guiding section and the leading-end pressing section, movement of the sheet in the discharge direction is restricted. That is, when movement of the medium discharged by the first discharge section is restricted, the medium may be displaced while being mounted on the first tray.

SUMMARY

To address the aforementioned problem, a post-processing device includes a first discharge section that discharges a medium subjected to recording by a recording device, a first tray on which the medium discharged by the first discharge section is mounted, a post-processing section that performs post-processing on the medium mounted on the first tray, a pressing section configured to perform a leading-end pressing operation of lowering a leading end of the medium by pressing the medium discharged by the first discharge section, and a control section that controls the pressing section, in which the control section performs the leading-end pressing operation after the medium is mounted on the first tray.

DESCRIPTION OF EXEMPLARY EMBODIMENTS

Recording System

Figure 1:
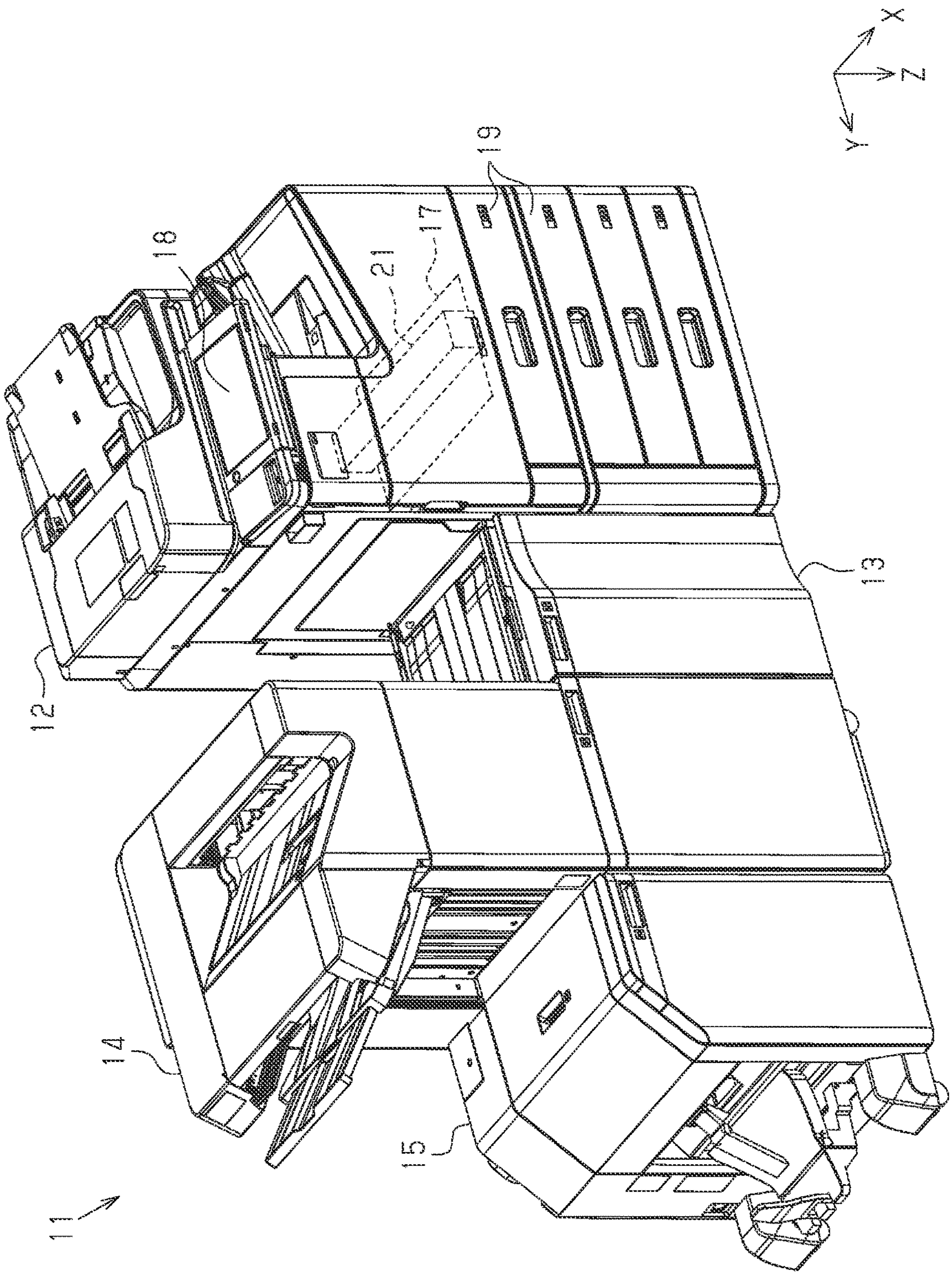
FIG. 1 is a perspective view illustrating an embodiment of a recording system including a post-processing device.

An embodiment of a recording system including a post-processing device will be described below with reference to the drawings.

In the drawings, assuming that a recording system 11 is placed on a horizontal plane, the direction of gravity is indicated by the Z-axis, and directions extending along the horizontal plane are indicated by the X-axis and the Y axis. The X-axis, the Y-axis, and the Z-axis are orthogonal to each other. In the following description, a direction parallel to the X-axis is also referred to as a width direction X, a direction parallel to the Y-axis is also referred to as a transport direction Y, and a direction parallel to the Z-axis is also referred to as a vertical direction Z.

The recording system 11 illustrated in FIG. 1 may include a recording device 12, an intermediate device 13, a post-processing device 14, and a saddle-folding device 15, which are arranged side by side in the transport direction Y. The recording device 12, the intermediate device 13, the post-processing device 14, and the saddle-folding device 15 are provided so as to be adjacent to each other.

The recording device 12 is a device that performs recording on a medium 17 by ejecting liquid. The recording device 12 of the present embodiment is an ink jet printer that records an image by ejecting ink, which is an example of a liquid, onto the medium 17, such as paper. The image is formed by the liquid adhering to the medium 17. Examples of the image include a photograph, a design, a character, a symbol, a mark, a line, and a table.

The recording device 12 may include an operation section 18, such as a touch panel, for operating the recording device 12 and the recording system 11 and a medium-accommodating section 19 in which media 17 are able to be accommodated in a layered state. The recording device 12 may include a plurality of medium-accommodating sections 19.

The recording device 12 includes a recording section 21 that performs recording by ejecting the liquid. The recording section 21 performs recording on the media 17 fed from the medium-accommodating section 19 one by one. The recording section 21 of the present embodiment is of a line type provided so as to extend entirely in the width direction X of the medium 17. The recording section 21 may be of a serial type for performing recording while moving in the width direction X of the medium 17.

The recording device 12 is able to perform single-sided recording for performing recording on only one side of the medium 17 and double-sided recording for performing recording on both sides of the medium 17. When performing single-sided recording, the recording device 12 performs recording on the front-side surface of the medium 17 and then feeds the medium 17 to the intermediate device 13. When performing double-sided recording, the recording device 12 performs recording on the front-side surface of the medium 17, then inverts the medium 17 to return the medium 17 to the recording section 21 and performs recording on the rear-side surface of the medium 17. The recording device 12 feeds the medium 17 on which recording has been performed on both sides to the intermediate device 13.

The intermediate device 13 feeds the medium 17 on which recording has been performed on one side or both sides to the post-processing device 14. When performing saddle-folding processing on the recorded medium 17 to fold the medium 17 in half, the post-processing device 14 feeds the medium 17 to the saddle-folding device 15. The saddle-folding device 15 may perform center-binding processing on the media 17 to bind the center of the media 17 by using a staple.

Post-Processing Device

Figure 2:
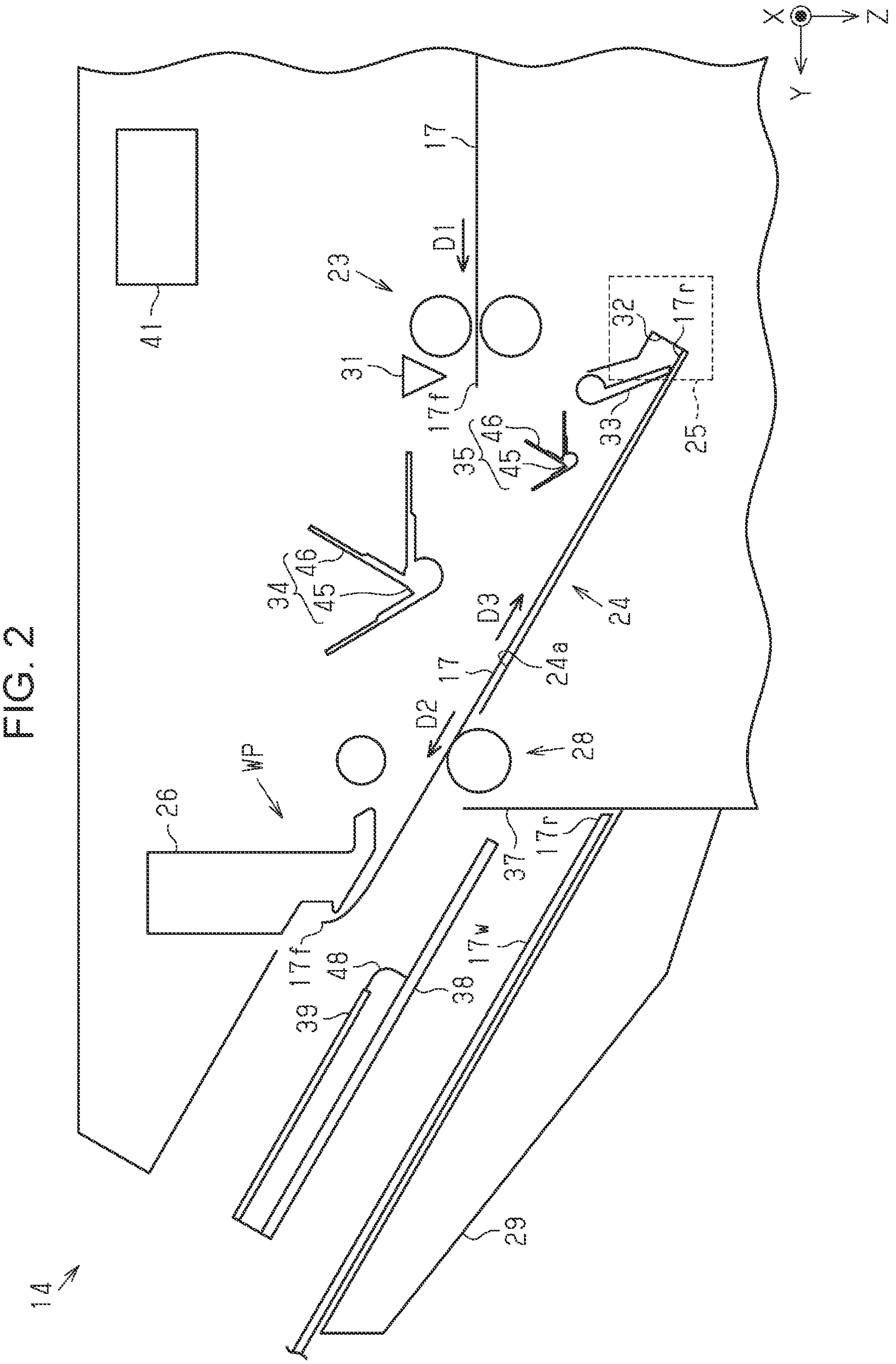
FIG. 2 is a schematic front view of the post-processing device in which a pressing section is at a waiting position.

As illustrated in FIG. 2, the post-processing device 14 includes a first discharge section 23, a first tray 24, a post-processing section 25, and a pressing section 26. The post-processing device 14 may include a second discharge section 28 and a second tray 29. The post-processing device 14 may include a detecting section 31 capable of detecting the medium 17, an end-portion adjusting section 32, a holding section 33, a first transport section 34, and a second transport section 35. The post-processing device 14 may include a support wall 37, a support section 38, and a curling suppressing member 39.

The post-processing device 14 includes a control section 41 that controls the pressing section 26. The control section 41 may perform overall control of driving respective mechanisms of the post-processing device 14 and may control various operations performed in the post-processing device 14. The control section 41 can be constituted by a circuit including α: one or more processors that execute various types of processing in accordance with a computer program; β: one or more hardware circuits that execute at least some of the various types of processing; or γ: a combination thereof. A hardware circuit is, for example, an application specific integrated circuit. A processor includes a CPU and memory, such as RAM and ROM, and the memory stores program code or commands which cause the CPU to execute processing. The memory, that is, a computer-readable medium, may be any readable medium accessible by using a general-purpose or dedicated computer.

The first discharge section 23 discharges the medium 17 subjected to recording by the recording device 12. The first discharge section 23 may be constituted by a pair of rollers. The first discharge section 23 discharges the medium 17 by rotating in a state of holding the medium 17. The first discharge section 23 discharges the medium 17 in a first discharge direction D1.

The medium 17 discharged by the first discharge section 23 is mounted on the first tray 24. The first tray 24 is located downstream of the first discharge section 23 in the first discharge direction D1 such that at least a portion of the first tray 24 is located below the first discharge section 23 in the vertical direction Z. Thus, the first tray 24 receives the medium 17 that drops when discharged by the first discharge section 23. The first tray 24 includes a stacking surface 24*a* on which media 17 is to be stacked.

The post-processing section 25 performs post-processing on the medium 17 mounted on the first tray 24. The post-processing section 25 of the present embodiment performs stapling processing on the number of media 17, which is to be processed, stacked on the first tray 24. The stapling processing is processing for binding a plurality of media 17 by using a staple. The post-processing section 25 binds the plurality of media 17 to obtain a medium bundle 17*w*. FIG. 2 illustrates a state in which a single medium 17 is mounted on the first tray 24 and in which the medium bundle 17*w* is mounted on the second tray 29.

The second discharge section 28 discharges the medium 17 mounted on the first tray 24. The second discharge section 28 discharges the medium 17 subjected to post-processing by the post-processing section 25. That is, the second discharge section 28 of the present embodiment is able to collectively discharge the bundle of media 17 stacked on the first tray 24. The second discharge section 28 may be constituted by a pair of rollers. The second discharge section 28 discharges the medium 17 by rotating in a state of holding the medium 17. The second discharge section 28 discharges the medium 17 in a second discharge direction D2.

The medium 17 discharged by the second discharge section 28 is mounted on the second tray 29. The second tray 29 is located downstream of the second discharge section 28 in the second discharge direction D2 such that at least a portion of the second tray 29 is located below the second discharge section 28 in the vertical direction Z. Thus, the second tray 29 receives the medium 17 that drops when discharged by the second discharge section 28.

The end-portion adjusting section 32 is located in a downstream end of the first tray 24 in an adjustment direction D3. The adjustment direction D3 is a direction in which the first transport section 34 and the second transport section 35 transport the medium 17 mounted on the first tray 24. The adjustment direction D3 extends parallel to the stacking surface 24*a*. In FIG. 2, the first transport section 34 and the second transport section 35 rotate counterclockwise and thereby transport the medium 17 mounted on the first tray 24 to the end-portion adjusting section 32. To adjust the medium 17, the first transport section 34 and the second transport section 35 cause the medium 17 to come into contact with the end-portion adjusting section 32.

The holding section 33 is located between the second transport section 35 and the end-portion adjusting section 32 in the adjustment direction D3. The holding section 33 is provided so as to be rotatable about a shaft. The holding section 33 is pressed against the first tray 24 by a spring (not illustrated). While pushing up the holding section 33, the medium 17 passes between the first tray 24 and the holding section 33 and comes into contact with the end-portion adjusting section 32. The holding section 33 holds the medium 17 against the first tray 24 to retain the medium 17 in an adjusted state.

Adjustment in the present embodiment denotes an operation of causing a trailing end 17*r* of the medium 17 to follow the end-portion adjusting section 32. The trailing end 17*r* of the medium 17 corresponds to an upstream end in the first discharge direction D1 and the second discharge direction D2 and to a downstream end in the adjustment direction D3. In the present embodiment, an end of the medium 17 which is opposite to the trailing end 17*r* is referred to as a leading end 17*f*. The leading end 17*f* corresponds to a downstream end in the first discharge direction D1 and the second discharge direction D2 and to an upstream end in the adjustment direction D3. The first discharge section 23 first discharges the leading end 17*f* and finally discharges the trailing end 17*r*.

The first transport section 34 and the second transport section 35 transport the medium 17 discharged by the first discharge section 23 and adjust the medium 17 by causing the medium 17 to come into contact with the end-portion adjusting section 32 such that the trailing end 17*r* of the medium 17 is aligned with the trailing end 17*r* of the medium 17 that has been mounted on the first tray 24. The media 17 sequentially discharged by the first discharge section 23 are stacked on the first tray 24 with the trailing ends 17*r* aligned.

The first transport section 34 is provided downstream of the first discharge section 23 in the first discharge direction D1 and upstream of the second transport section 35 in the adjustment direction D3. The first transport section 34 and the second transport section 35 are located above the first tray 24. The first transport section 34 and the second transport section 35 of the present embodiment have the same configuration but different sizes. Accordingly, the same configuration will be given the same reference numerals, and redundant description will be omitted.

The first transport section 34 may include a rotational shaft 45 and at least one paddle 46. The first transport section 34 of the present embodiment includes three paddles 46. Each of the paddles 46 has a base end portion fixed to the rotational shaft 45 and rotates integrally with the rotational shaft 45. A tip end portion of the paddle 46 has a plate shape and is elastically deformable. The first transport section 34 and the second transport section 35 may each be provided so as to extend entirely in the width direction X, or a plurality of first transport sections 34 may be provided side by side in the width direction X and a plurality of second transport sections 35 may be provided side by side in the width direction X.

The support wall 37 is provided between the second discharge section 28 and the second tray 29 in the second discharge direction D2. The support wall 37 may be provided vertically or inclined relative to the horizontal plane. The support wall 37 may support the trailing end 17*r* of the medium 17 discharged by the second discharge section 28. That is, the support wall 37 may be provided in a lower end of the inclined second tray 29 to support the medium 17 mounted on the second tray 29.

Figure 3:
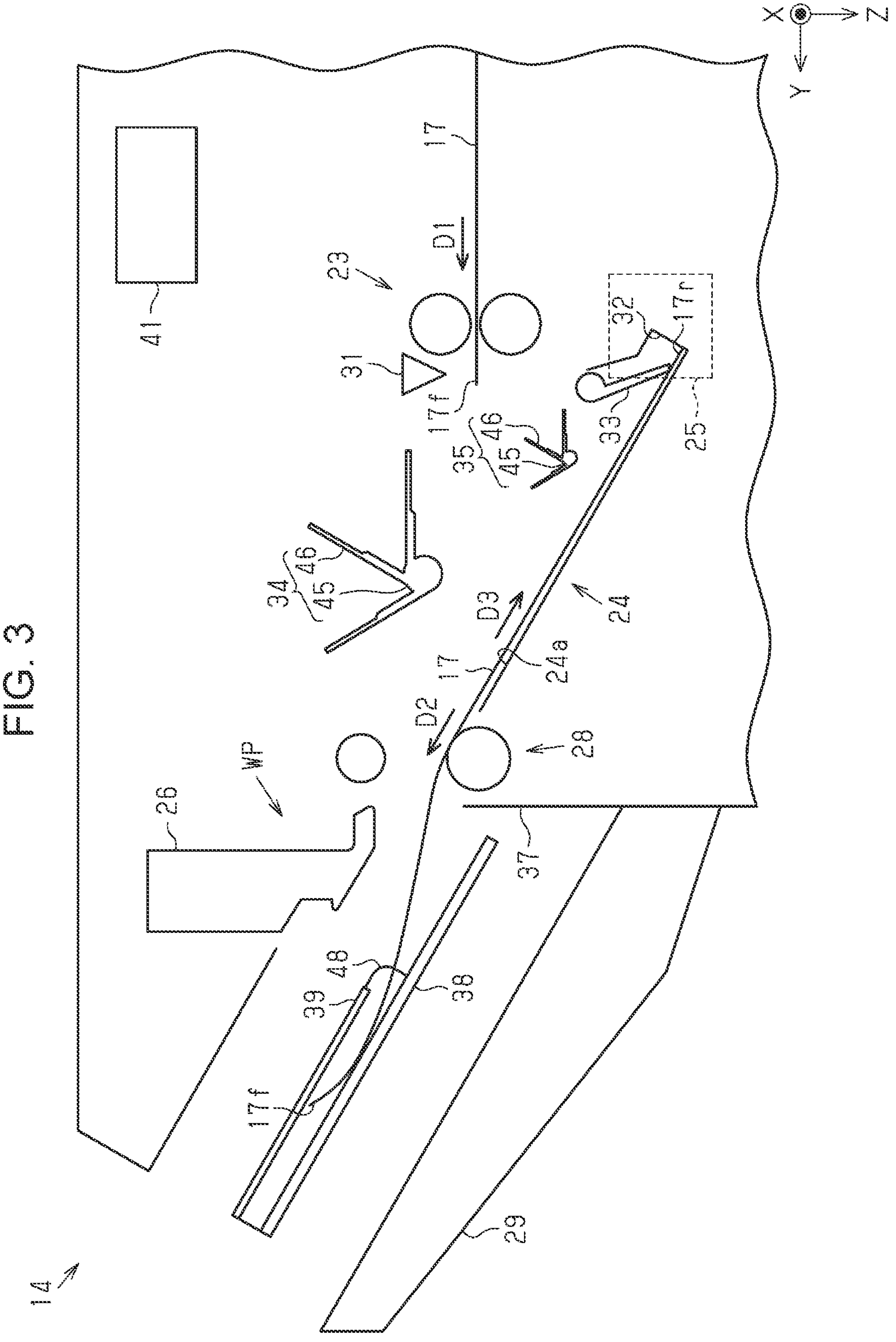
FIG. 3 is a schematic front view of the post-processing device that supports a medium of a first size.

As illustrated in FIG. 3, the support section 38 may include a guiding section 48 that guides an end of the medium 17 in the width direction X. The support section 38 is able to support a portion of the medium 17 mounted on the first tray 24. The support section 38 supports a portion of the medium 17 mounted on the first tray 24 and having a first size illustrated in FIG. 3. The support section 38 does not support the medium 17 of a second size illustrated in FIG. 2 and smaller than the first size. Specifically, in a state in which the medium 17 is mounted on the first tray 24 such that the trailing end 17*r* follows the end-portion adjusting section 32, the support section 38 supports a portion of the medium 17 of the first size and the support section 38 does not support the medium 17 of the second size.

The curling suppressing member 39 suppresses the medium 17 supported by the support section 38 from curling. The curling suppressing member 39 of the present embodiment is a plate provided above the support section 38 so as to be substantially parallel to the support section 38. The curling suppressing member 39 may move in a relative manner toward or away from the support section 38 such that a gap between the curling suppressing member 39 and the support section 38 changes. When the leading end 17*f* of the medium 17 that has curled comes into contact with the curling suppressing member 39, the curling is suppressed from increasing.

Figure 4:
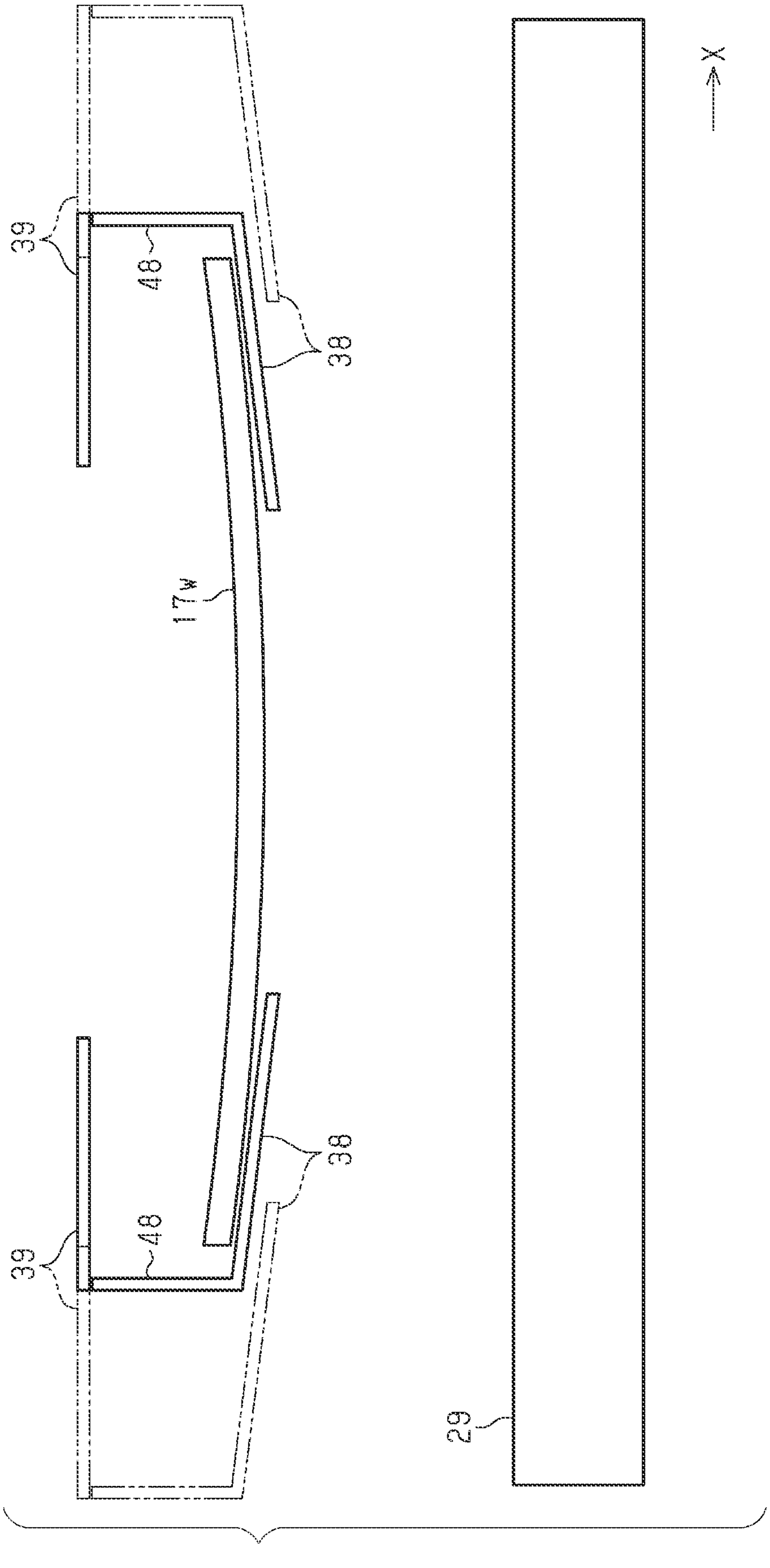
FIG. 4 is a schematic side view of a support section.

As illustrated in FIG. 4, the post-processing device 14 of the present embodiment includes a pair of support sections 38 provided with a gap therebetween in the width direction X and a pair of curling suppressing members 39 provided with a gap therebetween in the width direction X. The support section 38 of the present embodiment may be reciprocated in the X-axis direction by receiving power from a driving source (not illustrated). In the present embodiment, each of the support sections 38 is movable between a support position indicated by the solid line in FIG. 4 and a release position indicated by the two-dot chain line in FIG. 4. Each of the curling suppressing members 39 may move together with a corresponding one of the support sections 38. The support section 38 at the support position is able to support a portion of the medium 17 of the first size mounted on the first tray 24. Moreover, the support section 38 at the support position is able to hold, on the support section 38, the medium 17 discharged by the second discharge section 28. The release position is located on an outer side of the support position in the width direction X. Moving the support section 38 from the support position to the release position enables the supported medium 17 to drop to the second tray 29.

Pressing Section

Figure 5:
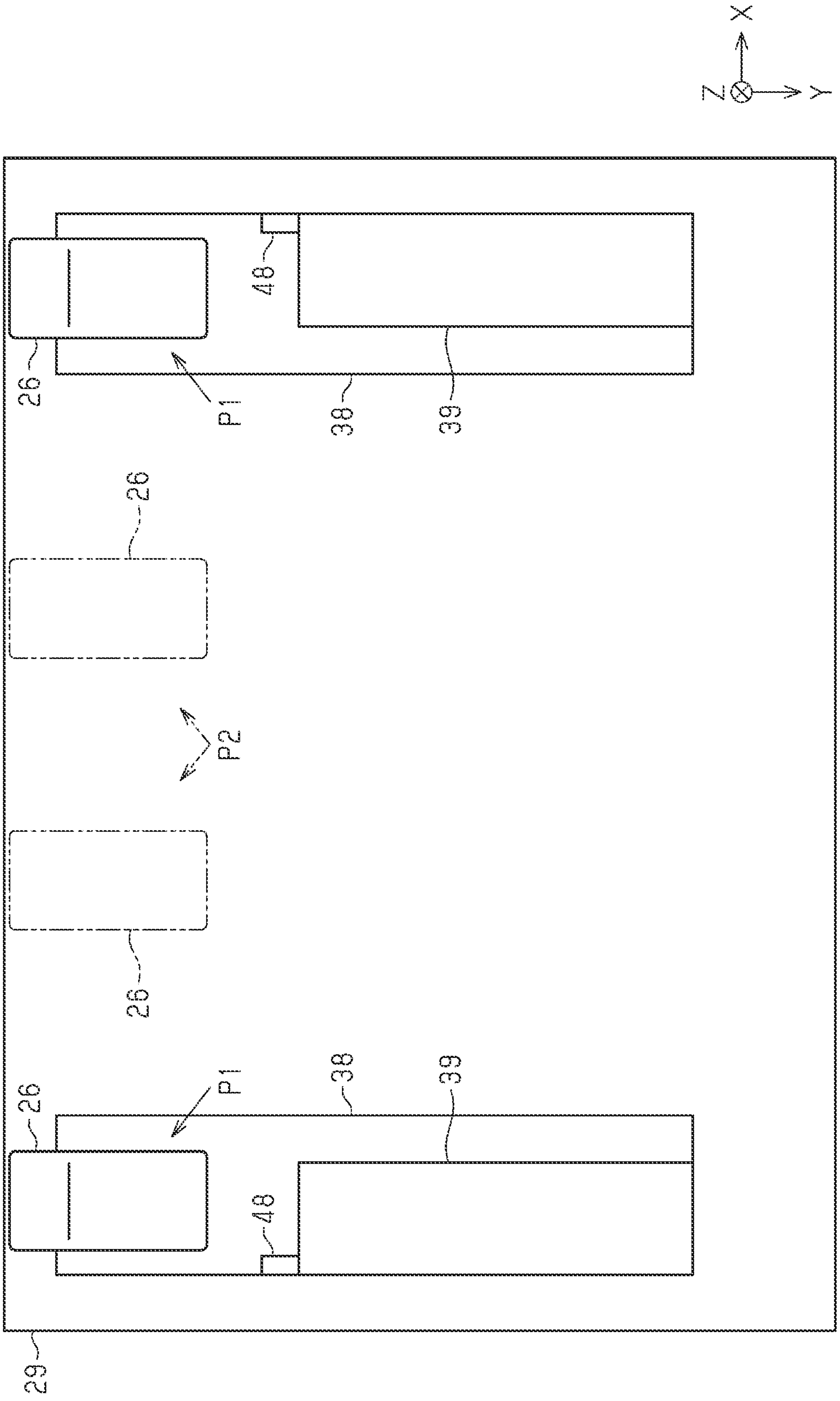
FIG. 5 is a schematic plan view of the support section.

As illustrated in FIG. 5, the post-processing device 14 may include a plurality of pressing sections 26. The post-processing device 14 of the present embodiment includes two pressing sections 26 arranged side by side in the width direction X.

Each of the pressing sections 26 may be configured to be movable in the width direction X of the medium 17. That is, the pressing section 26 may be reciprocated in the X-axis direction by receiving power from a driving source (not illustrated). In the present embodiment, each of the pressing sections 26 is movable between a first position P1 indicated by the solid line and a second position P2 indicated by the two-dot chain line. The first position P1 is on an outer side of the second position P2 in the width direction X. Thus, a gap between the pressing sections 26 when being located at the respective first positions P1 is greater than when being located at the respective second positions P2.

Figure 6:
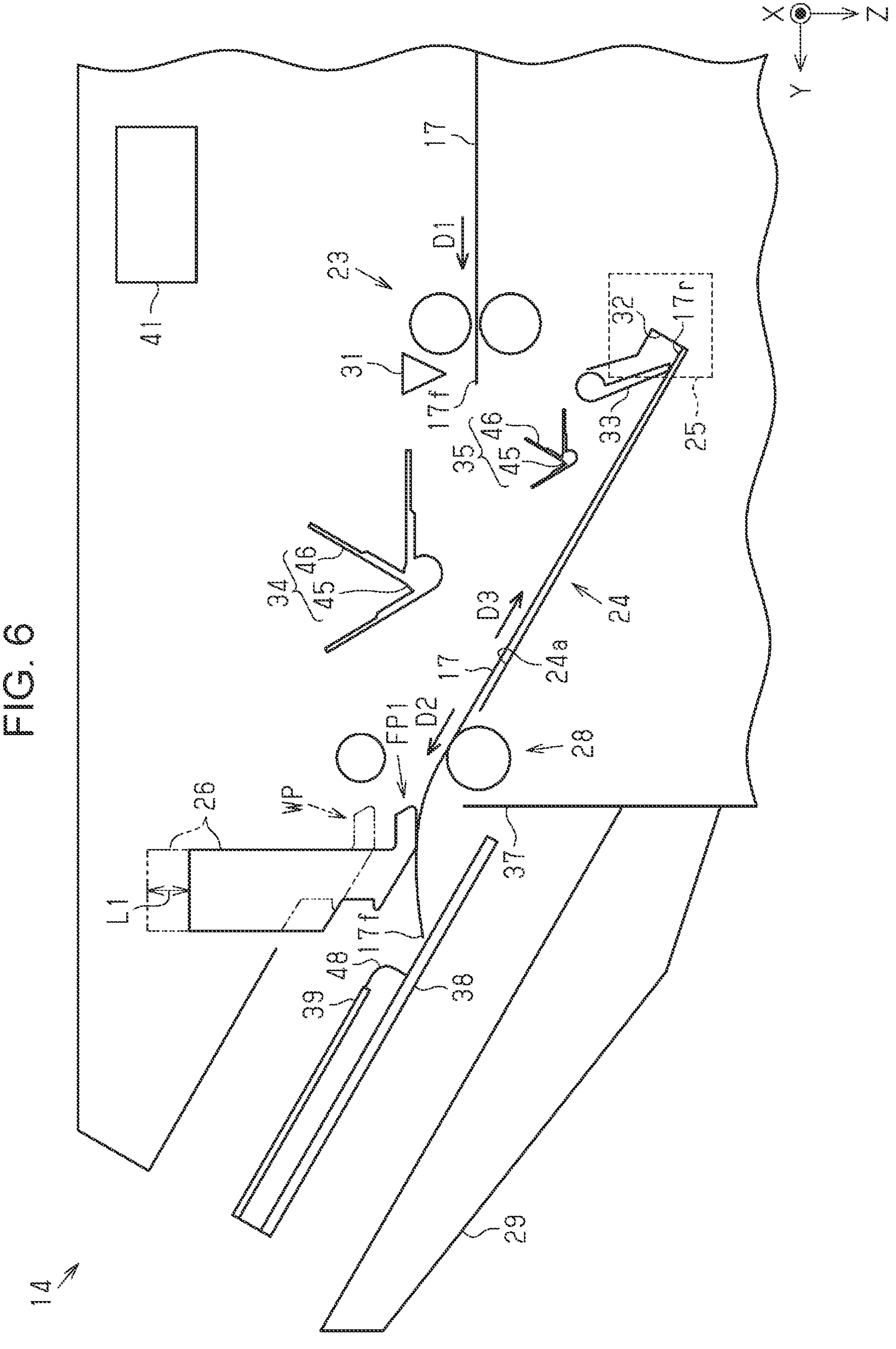
FIG. 6 is a schematic front view of the post-processing device in which the pressing section is at a first leading-end pressing position.

As illustrated in FIG. 6, each of the pressing sections 26 is able to be reciprocated in the Z-axis direction by receiving power from a driving source (not illustrated). The pressing section 26 is configured to be movable in the vertical direction Z. In the present embodiment, the respective pressing sections 26 move in the same manner. Accordingly, one of the pressing sections 26 will be described below.

Figure 7:
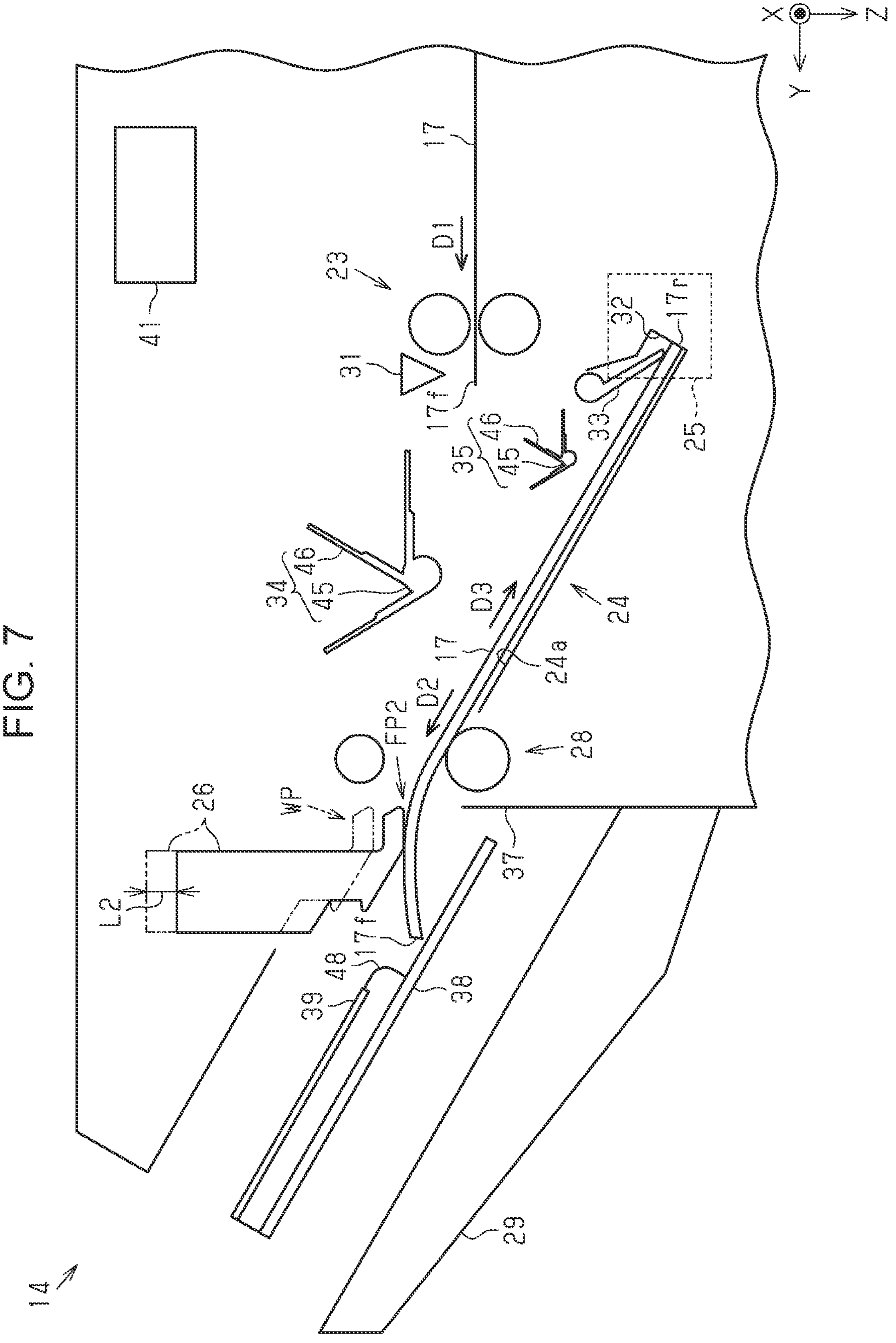
FIG. 7 is a schematic front view of the post-processing device in which the pressing section is at a second leading-end pressing position.
Figure 8:
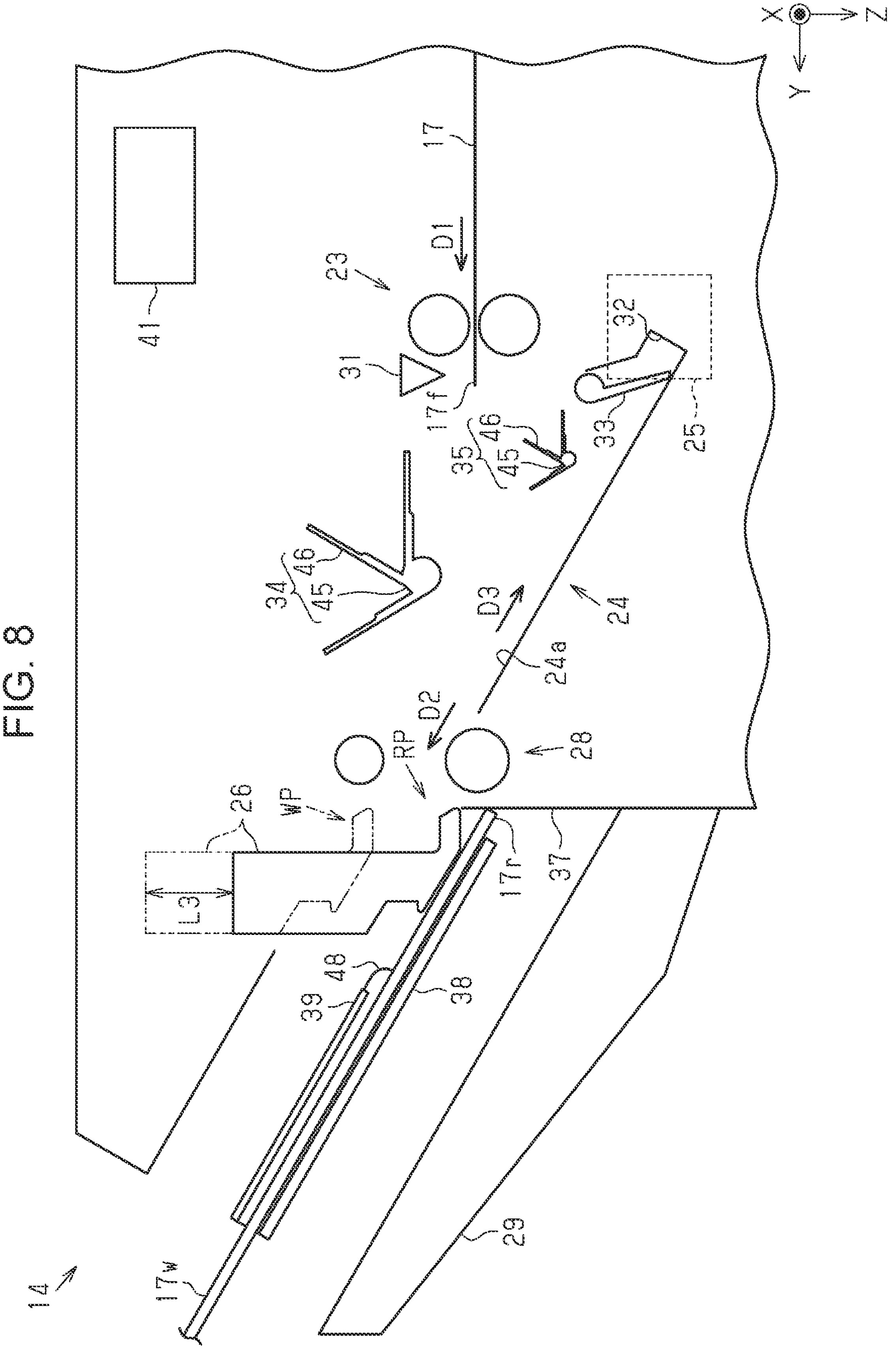
FIG. 8 is a schematic front view of the post-processing device in which the pressing section is at a trailing-end pressing position.

The pressing section 26 is movable between a waiting position WP illustrated in FIG. 2, a first leading-end pressing position FP1 illustrated in FIG. 6, a second leading-end pressing position FP2 illustrated in FIG. 7, and a trailing-end pressing position RP illustrated in FIG. 8. The first leading-end pressing position FP1 and the second leading-end pressing position FP2 are examples of a leading-end pressing position.

As illustrated in FIG. 2, the waiting position WP is a position at which the pressing section 26 does not come into contact with the medium 17 discharged by the first discharge section 23. The waiting position WP may be above the first discharge section 23 and the first tray 24.

As illustrated in FIG. 6, the first leading-end pressing position FP1 is below the waiting position WP. The first leading-end pressing position FP1 is between the second leading-end pressing position FP2 and the trailing-end pressing position RP. The first leading-end pressing position FP1 is below the waiting position WP by a first distance L1.

As illustrated in FIG. 7, the second leading-end pressing position FP2 is below the waiting position WP. The second leading-end pressing position FP2 is above the first leading-end pressing position FP1. That is, the second leading-end pressing position FP2 is between the waiting position WP and the first leading-end pressing position FP1. The second leading-end pressing position FP2 is below the waiting position WP by a second distance L2. The second distance L2 is shorter than the first distance L1.

As illustrated in FIG. 8, the trailing-end pressing position RP is below the waiting position WP, the first leading-end pressing position FP1, and the second leading-end pressing position FP2. The trailing-end pressing position RP is below the waiting position WP by a third distance L3. The third distance L3 is longer than the first distance L1.

Medium

As illustrated in FIG. 2, the medium 17 having an image formed thereon may be subjected to so-called curling that causes the medium 17 to be deformed so as to curve. The likelihood of the medium 17 curling varies depending on, for example, recording density.

The recording density denotes a ratio of an area in which an image is recorded to the overall area of the medium 17. In other words, the recording density denotes a ratio of the number of dots of actually ejected liquid to a maximum number of dots of liquid that are able to be ejected onto the medium 17.

When the recording density is high, the magnitude of curling of the medium 17 readily becomes greater than when the recording density is low. When a difference in the recording density is great between an upper surface and a lower surface of the medium 17, the magnitude of curling of the medium 17 readily becomes greater than when the difference is small. A direction of curling varies depending on which of the upper surface and the lower surface has higher recording density. For example, when the lower surface has recording density higher than the upper surface, the medium 17 readily curls such that the leading end 17*f* is lifted.

Leading-End Pressing Operation

The control section 41 may cause the pressing section 26 to be arranged at the first position P1 illustrated in FIG. 5 to enable a leading-end pressing operation for the medium 17 mounted on the first tray 24.

As illustrated in FIGS. 2, 6, and 7, the pressing section 26 is able to perform the leading-end pressing operation. The leading-end pressing operation is an operation of pressing the medium 17 discharged by the first discharge section 23 to lower the leading end 17*f* of the medium 17. The control section 41 enables the leading-end pressing operation after the medium 17 is mounted on the first tray 24. The control section 41 moves the pressing section 26 to the first leading-end pressing position FP1 or the second leading-end pressing position FP2 to enable the leading-end pressing operation.

The control section 41 may store a first number-of-sheets threshold, a second number-of-sheets threshold, and a threshold amount in advance. The first number-of-sheets threshold, the second number-of-sheets threshold, and the threshold amount may be input via, for example, the operation section 18. The first number-of-sheets threshold and the second number-of-sheets threshold may have the same value. The first number-of-sheets threshold may be larger than the second number-of-sheets threshold. The first number-of-sheets threshold may be smaller than the second number-of-sheets threshold.

The control section 41 may be able to determine whether or not to enable the leading-end pressing operation in accordance with the size of the medium 17. When the medium 17 has the first size, the control section 41 does not necessarily allow the leading-end pressing operation. When the medium 17 has the second size, the control section 41 may allow the leading-end pressing operation.

The control section 41 may be able to change, in accordance with the number of media 17 stacked on the first tray 24, a start timing at which the leading-end pressing operation is started.

When the stacking number is less than the second number-of-sheets threshold, the control section 41 may set the start timing to a first timing. The first timing is a timing at which a first adjustment time has lapsed after the medium 17 passes through the first discharge section 23. For example, when a state in which the medium 17 is detected by the detecting section 31 switches to a state in which no medium 17 is detected, the control section 41 may determine that the detecting section 31 has detected the trailing end 17*r* of the medium 17 and that the medium 17 has passed through the first discharge section 23. The control section 41 may start to lower the pressing section 26 when the first adjustment time has lapsed after the detecting section 31 detects the trailing end 17*r* of the medium 17.

When the stacking number is not less than the second number-of-sheets threshold, the control section 41 may set the start timing to a second timing later than the first timing. The second timing is a timing at which a second adjustment time has lapsed after the medium 17 passes through the first discharge section 23. The control section 41 may start to lower the pressing section 26 when the second adjustment time has lapsed after the detecting section 31 detects the trailing end 17*r* of the medium 17.

Each of the first adjustment time and the second adjustment time is time required to adjust the medium 17. The time required to adjust the medium 17 varies depending on the stacking number. The medium 17 being transported in the adjustment direction D3 passes through the holding section 33 so as to push up the holding section 33. Since the holding section 33 of the present embodiment is pressed by the spring, when the stacking number is large, the medium 17 is less likely to pass through the holding section 33 than when the stacking number is small, resulting in an increase in time required for adjustment. Also, when no holding section 33 is provided, increase in the stacking number results in an increase in time required for adjustment due to, for example, the effect of the media 17 occupying greater volume. That is, the first adjustment time when the stacking number is small is shorter than the second adjustment time when the stacking number is large.

The control section 41 may be able to change the leading-end pressing position in accordance with the number of media 17 stacked on the first tray 24.

As illustrated in FIG. 6, when the stacking number is less than the first number-of-sheets threshold, the control section 41 may move the pressing section 26 to the first leading-end pressing position FP1 to allow the leading-end pressing operation. That is, the control section 41 lowers the pressing section 26 located at the waiting position WP to the first leading-end pressing position FP1.

As illustrated in FIG. 7, when the stacking number is not less than the first number-of-sheets threshold, the control section 41 may move the pressing section 26 to the second leading-end pressing position FP2 to allow the leading-end pressing operation. That is, the control section 41 lowers the pressing section 26 located at the waiting position WP to the second leading-end pressing position FP2.

The control section 41 may be able to change, in accordance with the amount of liquid ejected onto the medium 17, a pressing time during which the medium 17 is pressed by the pressing section 26. The pressing time is a time during which the pressing section 26 is caused to be located at the first leading-end pressing position FP1 or the second leading-end pressing position FP2.

When the ejection amount is less than the threshold amount, the control section 41 may set the pressing time to a first time. When the ejection amount is not less than the threshold amount, the control section 41 may set the pressing time to a second time longer than the first time.

When the first time or the second time that is set has lapsed after the pressing section 26 is located at the first leading-end pressing position FP1 or the second leading-end pressing position FP2, the control section 41 moves the pressing section 26 from the first leading-end pressing position FP1 or the second leading-end pressing position FP2. The control section 41 may lift the pressing section 26 located at the first leading-end pressing position FP1 or the second leading-end pressing position FP2 to return the pressing section 26 to the waiting position WP. The control section 41 may cause the pressing section 26 to wait at the waiting position WP until the leading-end pressing operation for the next medium 17 is started.

The control section 41 may enable the leading-end pressing operation each time the medium 17 is adjusted. The post-processing device 14 of the present embodiment forms the medium bundle 17*w* by using the plurality of media 17 stacked on the first tray 24. When the medium 17 discharged by the first discharge section 23 is determined to be a final medium 17 that forms the medium bundle 17*w*, the control section 41 does not necessarily allow the leading-end pressing operation for the final medium 17. When the medium 17 discharged by the first discharge section 23 is not determined to be the final medium 17, the control section 41 may allow the leading-end pressing operation for the medium 17.

Trailing-End Pressing Operation

When enabling the trailing-end pressing operation for the medium 17 discharged by the second discharge section 28, the control section 41 may cause the pressing section 26 to be arranged at the second position P2 illustrated in FIG. 5. The control section 41 may cause the support section 38 to be arranged at the support position indicated by the solid line in FIG. 4.

As illustrated in FIG. 8, the second discharge section 28 collectively discharges the bundle of media 17 subjected to post-processing. The control section 41 may enable the trailing-end pressing operation for the medium 17 discharged by the second discharge section 28. The trailing-end pressing operation is an operation of lowering the trailing end 17*r* of the medium 17 by pressing the medium 17 discharged by the second discharge section 28. The control section 41 moves the pressing section 26 to the trailing-end pressing position RP after the medium 17 is discharged by the second discharge section 28 to enable the trailing-end pressing operation.

The control section 41 lowers the pressing section 26 located at the waiting position WP to the trailing-end pressing position RP. The pressing section 26 may perform the trailing-end pressing operation by moving along the support wall 37. The control section 41 moves the pressing section 26 to the trailing-end pressing position RP and then moves the pressing section 26 from the trailing-end pressing position RP. The control section 41 may lift the pressing section 26 located at the trailing-end pressing position RP to return the pressing section 26 to the waiting position WP. The control section 41 may cause the supported medium 17 to drop by moving the support section 38 to the release position indicated by the two-dot chain line in FIG. 4 while or after the trailing-end pressing operation is performed.

Operation

As illustrated in FIGS. 6 and 7, the pressing section 26 lowers the leading end 17*f* of the medium 17 mounted on the first tray 24 by performing the leading-end pressing operation. Curling of the leading end 17*f* side of the medium 17 is thereby corrected. This reduces the possibility of the next medium 17 discharged by the first discharge section 23 being caught up by curling.

As illustrated in FIG. 8, the pressing section 26 lowers the trailing end 17*r* of the medium 17 discharged by the second discharge section 28 by performing the trailing-end pressing operation. Curling of the trailing end 17*r* side of the medium 17 is thereby corrected.

The effect of the present embodiment will be described.

After the medium 17 discharged by the first discharge section 23 is mounted on the first tray 24, the control section 41 causes the pressing section 26 to perform the leading-end pressing operation. That is, the pressing section 26 presses the medium 17 in a state in which the medium 17 is mounted on the first tray 24. This makes it possible to suppress curling of the medium 17 and a degradation in an adjustment property of the medium 17.

The position of the uppermost medium 17 of the media 17 stacked on the first tray 24 may vary depending on the number of media 17 stacked on the first tray 24. That is, when the stacking number is large, the uppermost medium 17 is located higher than when the stacking number is small. When the stacking number is less than the first number-of-sheets threshold, the control section 41 moves the pressing section 26 to the first leading-end pressing position FP1. When the stacking number is not less than the first number-of-sheets threshold, the control section 41 moves the pressing section 26 to the second leading-end pressing position FP2. The second leading-end pressing position FP2 is above the first leading-end pressing position FP1. Accordingly, when the stacking number is not less than the first number-of-sheets threshold, the pressing section 26 presses the medium 17 at a position higher than when the stacking number is less than the first number-of-sheets threshold, thus making it possible to appropriately press the medium 17.

The ease of adjustment of the medium 17 discharged by the first discharge section 23 may vary depending on the number of media 17 stacked on the first tray 24. That is, when the stacking number is large, time required for adjustment may become longer than when the stacking number is small. In this regard, when the stacking number is not less than the second number-of-sheets threshold, the control section 41 starts the leading-end pressing operation at a timing later than when the stacking number is less than the second number-of-sheets threshold. As a result, it is possible to ensure the time for adjusting the medium 17 and further suppress a degradation in an adjustment property of the medium 17.

The magnitude of curling of the medium 17 subjected to recording with ejected liquid may change depending on the ejection amount of liquid. That is, when the ejection amount is large, the magnitude of curling readily becomes greater than when the ejection amount is small. In this regard, when the ejection amount is not less than the threshold amount, the control section 41 makes the pressing time longer than when the ejection amount is less than the threshold amount. This makes it possible to reduce curling even when the magnitude of curling readily becomes great.

The control section 41 enables the trailing-end pressing operation for the medium 17 discharged by the second discharge section 28. Accordingly, it is possible to reduce curling of the medium 17 even when the medium 17 curls such that the trailing end 17*r* warps upward.

The trailing end 17*r* of the medium 17 that has curled separates from the support wall 37. In this regard, since the pressing section 26 moves along the support wall 37 to press the medium 17, the trailing end 17*r* of the medium 17 is able to readily follow the support wall 37.

The control section 41 moves the pressing section 26 to the leading-end pressing position to enable the leading-end pressing operation. The control section 41 moves the pressing section 26 to the trailing-end pressing position RP to enable the trailing-end pressing operation. The trailing-end pressing position RP is below the first leading-end pressing position FP1 and the second leading-end pressing position FP2. Accordingly, it is possible to press the medium 17 by performing the trailing-end pressing operation even when the second tray 29 is provided at a position below the first tray 24.

Since the control section 41 causes the pressing section 26 to be located at a position close to an end in the width direction X to enable the leading-end pressing operation, it is possible to efficiently reduce curling caused in the leading end 17*f* of the medium 17. Since the control section 41 causes the pressing section 26 to be located at a position close to the center in the width direction X to enable the trailing-end pressing operation, it is possible to cause the medium 17 to curve such that the center of the medium 17 in the width direction X is located below the end. As a result, it is possible to cause the air between the medium 17 and the second tray 29 to readily escape when the medium 17 is mounted on the second tray 29, and it is possible to reduce disorder of the medium 17 mounted on the second tray 29.

When the medium 17 has the first size, the control section 41 does not allow the leading-end pressing operation, and when the medium 17 has the second size, the control section 41 allows the leading-end pressing operation. The curling suppressing member 39 suppresses the medium 17 of the first size from curling. This makes it possible to suppress curling by using a method according to the size of the medium 17.

When the medium 17 that has been discharged by the first discharge section 23 and mounted on the first tray 24 has curled, the next medium 17 discharged by the first discharge section 23 may come into contact with the medium 17 that has been discharged and buckle. In this regard, after the final medium 17 of the media 17 that form the medium bundle 17*w* is discharged by the first discharge section 23, until the medium bundle 17*w* is discharged from the first tray 24, the next medium 17 is not discharged by the first discharge section 23. When the medium 17 discharged by the first discharge section 23 is the final medium 17, the control section 41 does not allow the leading-end pressing operation. This makes it possible to improve throughput.

When the pressing section 26 is moved, for example, regardless of the number of media 17 stacked on the first tray 24, the medium 17 may be excessively pressed or insufficiently pressed. In this regard, since the control section 41 changes the leading-end pressing position in accordance with the stacking number, it is possible to appropriately press the medium 17 to reduce curling.

When the stacking number is less than the second number-of-sheets threshold, the control section 41 starts the leading-end pressing operation earlier than when the stacking number is not less than the second number-of-sheets threshold. Accordingly, when the stacking number is less than the second number-of-sheets threshold, the post-processing device 14 is able to receive the next medium 17 at an earlier timing than when the leading-end pressing operation is started at the same timing as when the stacking number is not less than the second number-of-sheets threshold.

The pressing section 26 performs the leading-end pressing operation and the trailing-end pressing operation. Accordingly, it is possible to simplify the configuration compared with a case in which a member for performing the leading-end pressing operation and a member for performing the trailing-end pressing operation are separately provided.

For example, when the medium 17 is pressed by a pressing section that rotates, a large space in which the pressing section moves needs to be ensured. When the medium 17 is pressed by the pressing section that rotates, a position at which the medium 17 is pressed by the pressing section may vary depending on the stacking number. In this regard, the pressing section 26 is reciprocated in the Z-axis direction. That is, the pressing section 26 operates linearly. Thus, it is possible to reduce a space in which the pressing section 26 moves and reduce a change in the position at which the medium 17 is pressed.

The present embodiment may be modified and implemented as follows. The present embodiment and modified examples thereof described below may be implemented in combination within a range in which a technical contradiction does not arise.

The post-processing section 25 may perform punching processing, shifting processing, and the like. The punching processing is processing for punching a hole in one or more media 17. The shifting processing is processing for discharging each set of media 17 to the second tray 29 while each set is shifted in position.

The pressing section 26 may move in a direction different from the vertical direction Z. For example, the pressing section 26 may move in a direction perpendicular to the stacking surface 24*a* to perform the leading-end pressing operation.

The likelihood of the medium 17 curling also varies depending on the grain direction of the medium 17. The control section 41 may enable at least one of the leading-end pressing operation and the trailing-end pressing operation in accordance with the grain direction of the medium 17. The grain direction is the orientation of fibers that form the medium 17. When the grain direction does not match the first discharge direction D1, the magnitude of curling readily becomes greater than when the grain direction matches the first discharge direction D1. Accordingly, when the grain direction matches the first discharge direction D1, the control section 41 may set the pressing time to the first time, and when the grain direction does not match the first discharge direction D1, the control section 41 may set the pressing time to the second time longer than the first time.

A frictional force generated between the first tray 24 and the medium 17 is smaller than a frictional force generated between media 17. Thus, the first adjustment time for the first medium 17 in contact with the first tray 24 is shorter than the second adjustment time for the second medium 17 in contact with the first medium 17. Accordingly, the second number-of-sheets threshold may be one. When the number of media 17 stacked on the first tray 24 is zero, the control section 41 may start the leading-end pressing operation at the first timing at which the first adjustment time has lapsed after the first medium 17 passes through the first discharge section 23. When the stacking number is one or more, the control section 41 may start the leading-end pressing operation at the second timing at which the second adjustment time longer than the first adjustment time has lapsed after the second or subsequent medium 17 passes through the first discharge section 23.

The control section 41 may enable the leading-end pressing operation even for the final medium 17 that forms the medium bundle 17*w*.

The control section 41 may enable the leading-end pressing operation regardless of the size of the medium 17.

The post-processing device 14 may be configured to include a single pressing section 26.

The pressing section 26 does not necessarily move in the width direction X. The pressing section 26 may perform the leading-end pressing operation and the trailing-end pressing operation at the same position in the width direction X.

The post-processing device 14 may include three or more pressing sections 26. The control section 41 may cause all the pressing sections 26 to perform the leading-end pressing operation and the trailing-end pressing operation. The control section 41 may cause some of the pressing sections 26 to perform the leading-end pressing operation and some of the pressing sections 26 to perform the trailing-end pressing operation.

The trailing-end pressing position RP may be the same position as the first leading-end pressing position FP1 or the second leading-end pressing position FP2.

The pressing section 26 may move in a direction intersecting the support wall 37 to perform the trailing-end pressing operation.

The pressing section 26 may perform the trailing-end pressing operation for the medium 17 that has been mounted on the second tray 29.

The control section 41 may enable the leading-end pressing operation regardless of the amount of liquid ejected onto the medium 17.

The control section 41 may enable the leading-end pressing operation regardless of the number of media 17 stacked on the first tray 24.

The pressing section 26 may include a blowing mechanism that blows air to the medium 17. The blowing mechanism may press the medium 17 by blowing air to the medium 17. That is, the pressing section 26 may be fixed. When the number of media 17 stacked on the first tray 24 is less than the first number-of-sheets threshold, the control section 41 may make the air blowing to the medium 17 stronger than when the stacking number is not less than the first number-of-sheets threshold. For example, when the amount of liquid ejected onto the medium 17 is less than the threshold amount, the control section 41 may set a time for blowing air to the medium 17 to a first time. When the ejection amount is not less than the threshold amount, the control section 41 may set the time for blowing air to the medium 17 to a second time longer than the first time.

Although the control section 41 that controls the pressing section 26 is provided in the post-processing device 14 in the present embodiment, there is no limitation thereto. For example, the configuration may be such that, when a control signal is input from a control unit provided in a main body of a recording device, a pressing unit is controlled by the control signal. When such a configuration is adopted, the recording device including a post-processing device constitutes a sheet post-processing device.

Any kind of liquid may be selected as long as it is possible to perform recording on the medium 17 by adhesion of the liquid to the medium 17. For example, ink includes those obtained by dissolving, dispersing, or mixing particles of a functional material formed of a solid material, such as a pigment or metal particles, in a solvent and encompasses various compositions, such as an aqueous ink, an oil-based ink, a gel ink, and a hot melt ink.

Hereinafter, technical concepts and operational effects thereof that are understood from the above-described embodiment and modified examples will be described.

A post-processing device includes a first discharge section that discharges a medium subjected to recording by a recording device, a first tray on which the medium discharged by the first discharge section is mounted, a post-processing section that performs post-processing on the medium mounted on the first tray, a pressing section configured to perform a leading-end pressing operation of lowering a leading end of the medium by pressing the medium discharged by the first discharge section, and a control section that controls the pressing section, in which the control section performs the leading-end pressing operation after the medium is mounted on the first tray.

According to such a configuration, the control section causes the pressing section to perform the leading-end pressing operation after the medium discharged by the first discharge section is mounted on the first tray. That is, the pressing section presses the medium in a state in which the medium is mounted on the first tray. Accordingly, it is possible to reduce curling of the medium and a degradation in an adjustment property of the medium.

In the post-processing device, the control section may be configured to change a leading-end pressing position, to which the pressing section is moved to perform the leading-end pressing operation, in accordance with a stacking number of media stacked on the first tray, and when the stacking number is less than a first number-of-sheets threshold, the control section may move the pressing section to a first leading-end pressing position to perform the leading-end pressing operation, and when the stacking number is not less than the first number-of-sheets threshold, the control section may move the pressing section to a second leading-end pressing position above the first leading-end pressing position to perform the leading-end pressing operation.

The position of the uppermost medium of the media stacked on the first tray varies depending on the stacking number of media stacked on the first tray. That is, when the stacking number is large, the uppermost medium is located higher than when the stacking number is small. According to such a configuration, when the stacking number is less than the first number-of-sheets threshold, the control section moves the pressing section to the first leading-end pressing position. When the stacking number is not less than the first number-of-sheets threshold, the control section moves the pressing section to the second leading-end pressing position. The second leading-end pressing position is above the first leading-end pressing position. Accordingly, when the stacking number is not less than the first number-of-sheets threshold, the pressing section presses the medium at a position higher than when the stacking number is less than the first number-of-sheets threshold, thus making it possible to appropriately press the medium.

In the post-processing device, the control section may be configured to change, in accordance with the stacking number of media stacked on the first tray, a start timing at which the leading-end pressing operation is started, and when the stacking number is less than a second number-of-sheets threshold, the control section may set the start timing to a first timing, and when the stacking number is not less than the second number-of-sheets threshold, the control section may set the start timing to a second timing later than the first timing.

The ease of adjustment of the medium discharged by the first discharge section varies depending on the stacking number of media stacked on the first tray. That is, when the stacking number is large, time required for adjustment becomes longer than when the stacking number is small. In this regard, according to the aforementioned configuration, when the stacking number is not less than the second number-of-sheets threshold, the control section starts the leading-end pressing operation at a timing later than when the stacking number is less than the second number-of-sheets threshold. As a result, it is possible to ensure the time for adjusting the medium and suppress a degradation in an adjustment property of the medium.

In the post-processing device, the recording device may be a device that performs recording on the medium by ejecting a liquid, the control section may be configured to change, in accordance with an ejection amount of the liquid ejected onto the medium, a pressing time during which the medium is pressed by the pressing section, and when the ejection amount is less than a threshold amount, the control section may set the pressing time to a first time, and when the ejection amount is not less than the threshold amount, the control section may set the pressing time to a second time longer than the first time.

The magnitude of curling of the medium subjected to recording with ejected liquid may change depending on the ejection amount of liquid. That is, when the ejection amount is large, the magnitude of curling readily becomes greater than when the ejection amount is small. In this regard, according to the aforementioned configuration, when the ejection amount is not less than the threshold amount, the control section makes the pressing time longer than when the ejection amount is less than the threshold amount. This makes it possible to reduce curling even when the magnitude of curling readily becomes great.

The post-processing device may further include a second discharge section that discharges the medium subjected to the post-processing by the post-processing section and a second tray on which the medium discharged by the second discharge section is mounted, in which the pressing section may be configured to perform a trailing-end pressing operation of lowering a trailing end of the medium by pressing the medium discharged by the second discharge section.

According to such a configuration, the control section enables the trailing-end pressing operation for the medium discharged by the second discharge section. Accordingly, it is possible to reduce curling of the medium even when the medium curls such that the trailing end warps upward.

The post-processing device may further include a support wall that is provided between the second discharge section and the second tray and supports the trailing end of the medium discharged by the second discharge section, in which the pressing section may perform the trailing-end pressing operation by moving along the support wall.

The trailing end of the medium that has curled separates from the support wall. In this regard, according to the aforementioned configuration, since the pressing section moves along the support wall to press the medium, the trailing end of the medium is able to readily follow the support wall.

In the post-processing device, the control section may move the pressing section to a leading-end pressing position to perform the leading-end pressing operation and may move the pressing section to a trailing-end pressing position to perform the trailing-end pressing operation, and the trailing-end pressing position may be below the leading-end pressing position.

According to such a configuration, the control section moves the pressing section to the leading-end pressing position to enable the leading-end pressing operation. The control section moves the pressing section to the trailing-end pressing position to enable the trailing-end pressing operation. The trailing-end pressing position is below the leading-end pressing position. Accordingly, it is possible to press the medium by performing the trailing-end pressing operation even when the second tray is provided at a position below the first tray.

In the post-processing device, the pressing section may be configured so as to move in a width direction of the medium, the control section may cause the pressing section to be arranged at a first position to perform the leading-end pressing operation for the medium mounted on the first tray and may cause the pressing section to be arranged at a second position to perform the trailing-end pressing operation for the medium discharged by the second discharge section, and the first position may be located on an outer side of the second position in the width direction.

According to such a configuration, since the control section causes the pressing section to be located at a position close to an end in the width direction to enable the leading-end pressing operation, it is possible to efficiently reduce curling caused in the leading end of the medium. Since the control section causes the pressing section to be located at a position close to the center in the width direction to enable the trailing-end pressing operation, it is possible to cause the medium to curve such that the center of the medium in the width direction is located below the end. As a result, it is possible to cause the air between the medium and the second tray to readily escape when the medium is mounted on the second tray and possible to reduce disorder of the medium mounted on the second tray.

The post-processing device may further include a support section that supports a portion of the medium mounted on the first tray and having a first size and a curling suppressing member that suppresses the medium supported by the support section from curling, in which the support section does not necessarily support the medium of a second size smaller than the first size, and the control section does not necessarily perform the leading-end pressing operation when a size of the medium is the first size and may perform the leading-end pressing operation when the size of the medium is the second size.

According to such a configuration, when the medium has the first size, the control section does not allow the leading-end pressing operation, and when the medium has the second size, the control section allows the leading-end pressing operation. The curling suppressing member suppresses the medium of the first size from curling. This makes it possible to suppress curling by using a method according to the size of the medium.

In the post-processing device, in a case in which a medium bundle is formed by a plurality of media mounted on the first tray, when the medium discharged by the first discharge section is determined to be a final medium that forms the medium bundle, the control section does not necessarily perform the leading-end pressing operation for the final medium, and when the medium discharged by the first discharge section is not determined to be the final medium, the control section may perform the leading-end pressing operation for the medium.

When the medium that has been discharged by the first discharge section and mounted on the first tray has curled, the next medium discharged by the first discharge section may come into contact with the medium that has been discharged and buckle. In this regard, after the final medium of the media that form the medium bundle is discharged by the first discharge section, until the medium bundle is discharged from the first tray, the next medium is not discharged by the first discharge section. According to such a configuration, when the medium discharged by the first discharge section is the final medium, the control section does not allow the leading-end pressing operation. This makes it possible to improve throughput.

What is claimed is:

1. A post-processing device comprising:

a first discharge section that discharges a medium subjected to recording by a recording device;

a first tray on which the medium discharged by the first discharge section in a first direction is mounted;

a post-processing section that performs post-processing on the medium mounted on the first tray;

a pressing section configured to perform a leading-end pressing operation of lowering a leading end of the medium by pressing the medium discharged by the first discharge section;

a support section that supports a portion of the medium mounted on the first tray and having a first size; and a curling suppressing member that suppresses the medium supported by the support section from curling, a control section that controls the pressing section, wherein the support section does not support the medium of a second size smaller than the first size, the control section:

performs the leading-end pressing operation after the medium is mounted on the first tray, does not perform the leading-end pressing operation when a size of the medium is the first size, and performs the leading-end pressing operation when the size of the medium is the second size.

2. The post-processing device according to claim 1, wherein the control section is configured to change a leading-end pressing position, to which the pressing section is moved to perform the leading-end pressing operation, in accordance with a stacking number of media stacked on the first tray, and when the stacking number is less than a first number-of-sheets threshold, the control section moves the pressing section to a first leading-end pressing position to perform the leading-end pressing operation, and when the stacking number is not less than the first number-of-sheets threshold, the control section moves the pressing section to a second leading-end pressing position above the first leading-end pressing position to perform the leading-end pressing operation.

3. The post-processing device according to claim 1, wherein the control section is configured to change, in accordance with a stacking number of media stacked on the first tray, a start timing at which the leading-end pressing operation is started, and when the stacking number is less than a second number-of-sheets threshold, the control section sets the start timing to a first timing, and when the stacking number is not less than the second number-of-sheets threshold, the control section sets the start timing to a second timing later than the first timing.

4. The post-processing device according to claim 1, wherein the recording device is a device that performs recording on the medium by ejecting a liquid, the control section is configured to change, in accordance with an ejection amount of the liquid ejected onto the medium, a pressing time during which the medium is pressed by the pressing section, and when the ejection amount is less than a threshold amount, the control section sets the pressing time to a first time, and when the ejection amount is not less than the threshold amount, the control section sets the pressing time to a second time longer than the first time.

5. The post-processing device according to claim 1, further comprising:

the second discharge section is configured to discharge the medium subjected to the post-processing by the post-processing section; and a second tray on which the medium discharged by the second discharge section is mounted, wherein the pressing section is configured to perform a trailing-end pressing operation of lowering a trailing end of the medium by pressing the medium discharged by the second discharge section.

6. The post-processing device according to claim 5, further comprising:

a support wall that is provided between the second discharge section and the second tray and supports the trailing end of the medium discharged by the second discharge section, wherein the pressing section performs the trailing-end pressing operation by moving along the support wall.

7. The post-processing device according to claim 5, wherein the pressing section is configured so as to move in a width direction of the medium, the control section causes the pressing section to be arranged at a first position to perform the leading-end pressing operation for the medium mounted on the first tray and causes the pressing section to be arranged at a second position to perform the trailing-end pressing operation for the medium discharged by the second discharge section, and the first position is located on an outer side of the second position in the width direction.

8. The post-processing device according to claim 1, wherein in a case in which a medium bundle is formed by a plurality of media mounted on the first tray, when the medium discharged by the first discharge section is determined to be a final medium that forms the medium bundle, the control section does not perform the leading-end pressing operation for the final medium, and when the medium discharged by the first discharge section is not determined to be the final medium, the control section performs the leading-end pressing operation for the medium.

9. A post-processing device comprising:

a first discharge section that discharges a medium subjected to recording by a recording device;

a first tray on which the medium discharged by the first discharge section in a first direction is mounted;

a post-processing section that performs post-processing on the medium mounted on the first tray;

a second discharge section that discharges the medium subjected to the post-processing by the post-processing section;

a second tray on which the medium discharged by the second discharge section is mounted;

a pressing section configured to perform a leading-end pressing operation of lowering a leading end of the medium by pressing the medium discharged by the first discharge section;

a control section that controls the pressing section, wherein the pressing section is configured to perform a trailing-end pressing operation of lowering a trailing end of the medium by pressing the medium discharged by the second discharge section, the control section is configured to:

perform the leading-end pressing operation after the medium is mounted on the first tray, move the pressing section to a leading-end pressing position to perform the leading-end pressing operation, and move the pressing section to a trailing-end pressing position to perform the trailing-end pressing operation, the trailing-end pressing position being below the leading-end pressing position.

10. The post-processing device according to claim 9, wherein the control section is configured to change a leading-end pressing position, to which the pressing section is moved to perform the leading-end pressing operation, in accordance with a stacking number of media stacked on the first tray, and when the stacking number is less than a first number-of-sheets threshold, the control section moves the pressing section to a first leading-end pressing position to perform the leading-end pressing operation, and when the stacking number is not less than the first number-of-sheets threshold, the control section moves the pressing section to a second leading-end pressing position above the first leading-end pressing position to perform the leading-end pressing operation.

11. The post-processing device according to claim 9, wherein the control section is configured to change, in accordance with a stacking number of media stacked on the first tray, a start timing at which the leading-end pressing operation is started, and when the stacking number is less than a second number-of-sheets threshold, the control section sets the start timing to a first timing, and when the stacking number is not less than the second number-of-sheets threshold, the control section sets the start timing to a second timing later than the first timing.

12. The post-processing device according to claim 9, wherein the recording device is a device that performs recording on the medium by ejecting a liquid, the control section is configured to change, in accordance with an ejection amount of the liquid ejected onto the medium, a pressing time during which the medium is pressed by the pressing section, and when the ejection amount is less than a threshold amount, the control section sets the pressing time to a first time, and when the ejection amount is not less than the threshold amount, the control section sets the pressing time to a second time longer than the first time.

13. The post-processing device according to claim 9, wherein in a case in which a medium bundle is formed by a plurality of media mounted on the first tray, when the medium discharged by the first discharge section is determined to be a final medium that forms the medium bundle, the control section does not perform the leading-end pressing operation for the final medium, and when the medium discharged by the first discharge section is not determined to be the final medium, the control section performs the leading-end pressing operation for the medium.

* * * * *